(12) United States Patent
Suzuki et al.

(10) Patent No.: US 11,708,047 B2
(45) Date of Patent: Jul. 25, 2023

(54) AIRBAG DEVICE

(71) Applicant: TOYODA GOSEI CO., LTD., Kiyosu (JP)

(72) Inventors: Yuya Suzuki, Kiyosu (JP); Koji Kawamura, Kiyosu (JP); Takenori Ozaki, Nagoya (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 18/057,245

(22) Filed: Nov. 21, 2022

(65) Prior Publication Data

US 2023/0174011 A1 Jun. 8, 2023

(30) Foreign Application Priority Data

Dec. 3, 2021 (JP) .................................. 2021-196914

(51) Int. Cl.
*B60R 21/239* (2006.01)
*B60R 21/203* (2006.01)

(52) U.S. Cl.
CPC .......... *B60R 21/239* (2013.01); *B60R 21/203* (2013.01)

(58) Field of Classification Search
None
See application file for complete search history.

(56) References Cited

U.S. PATENT DOCUMENTS

| | | | |
|---|---|---|---|
| 8,646,808 B2 | 2/2014 | Williams | |
| 10,882,487 B2 | 1/2021 | White et al. | |
| 2011/0309605 A1* | 12/2011 | Kumagai | B60R 21/239 |
| | | | 280/743.2 |
| 2019/0299913 A1 | 10/2019 | Tanaka et al. | |

FOREIGN PATENT DOCUMENTS

| | | | | |
|---|---|---|---|---|
| CN | 110520333 A | * | 11/2019 | .......... B60R 21/203 |
| JP | 2008143509 A | * | 6/2008 | |
| JP | 2019-172172 A | | 10/2019 | |
| KR | 20150078934 A | * | 7/2015 | .......... B60R 21/239 |

\* cited by examiner

*Primary Examiner* — Faye M Fleming
(74) *Attorney, Agent, or Firm* — Posz Law Group, PLC

(57) ABSTRACT

An airbag device includes an airbag, a blocking member that can adjust an exhaust hole of the airbag to a blocked state and an opened state, a coupling member, and a holding and releasing unit, which maintains a state of blocking the exhaust hole by holding the coupling member. When the holding and releasing unit releases the holding of the coupling member, the blocking member inverts in such a way as to be fed out from an inner peripheral face side of the airbag to an outer peripheral face side through the exhaust hole owing to being pressed by inflating gas, and causes inflating gas to be discharged from a through hole formed between leading end regions of outer peripheral edges of a first panel portion and a second panel portion in the blocking member and a communication hole communicating with the exhaust hole.

4 Claims, 11 Drawing Sheets

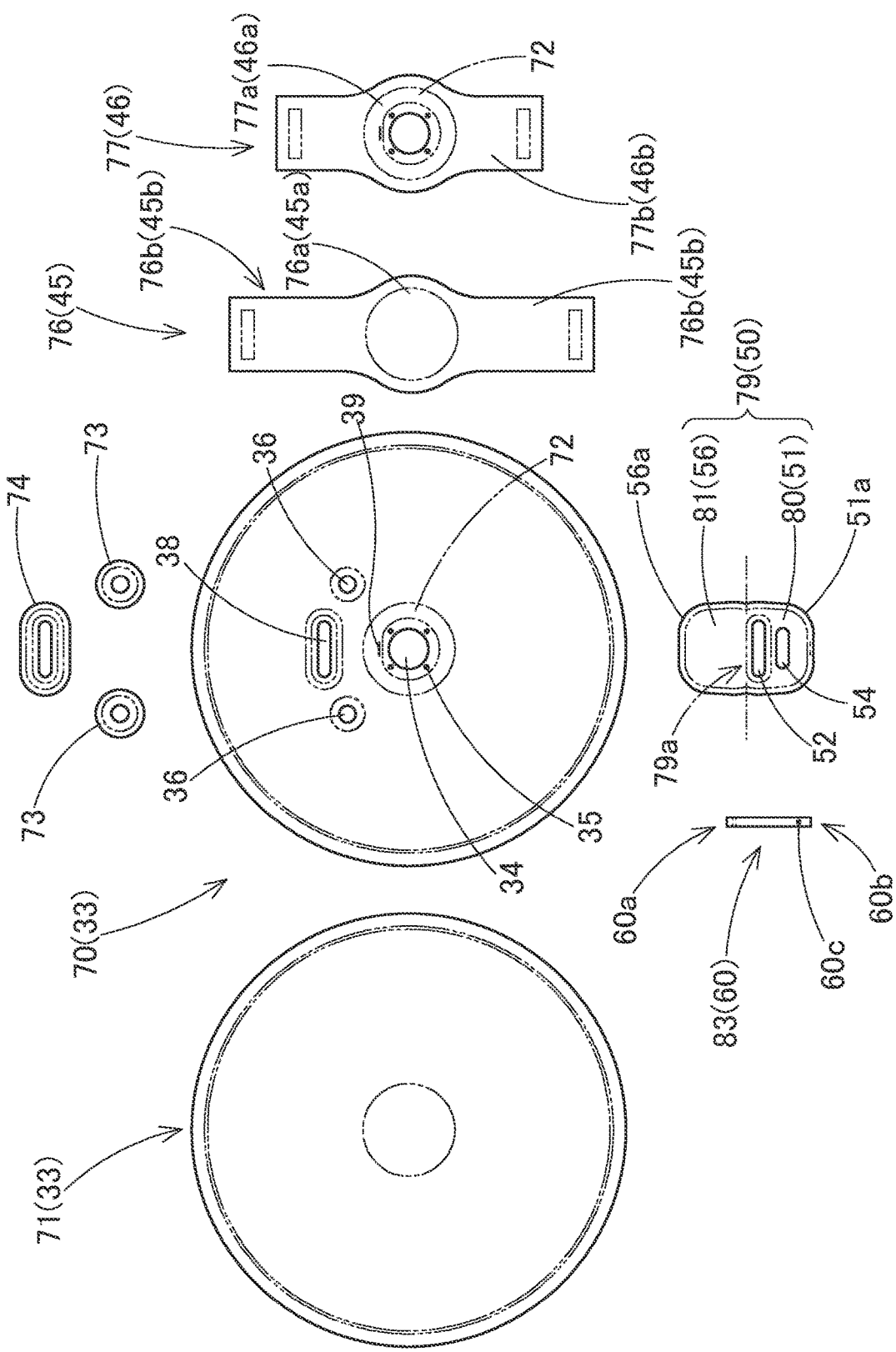

AIRBAG DEVICE

CROSS-REFERENCE TO RELATED APPLICATIONS

The present application claims priority from Japanese Patent Application No. 2021-196914 of Suzuki et al, filed on Dec. 3, 2021, the disclosures of which are hereby incorporated into the present application by reference.

BACKGROUND

Technical Field

The present invention relates to an airbag device such that an internal pressure of an airbag can be adjusted when the airbag inflates by discharging an inflating gas from an internal pressure adjustment exhaust hole provided in a peripheral wall of the airbag.

Description of Related Art

An existing configuration including an airbag having an exhaust hole through which an inflating gas can be discharged to adjust internal pressure in a peripheral wall, a blocking member that can adjust the exhaust hole to a blocked state and an opened state, and an actuator that maintains a state wherein the exhaust hole is blocked by holding a leading end portion side of a coupling member whose base portion side is coupled to the blocking member, and shifts the exhaust hole to an opened state by releasing the holding of the leading end portion side of the coupling member, is known as an airbag device (for example, refer to U.S. Pat. No. 8,646,808).

The blocking member is a tubular member whose leading end is opened, is disposed on an inner peripheral face side of the airbag by being pulled by the coupling member when the exhaust hole is blocked, and extends from a peripheral edge of the exhaust hole. The blocking member is such that when blocking the exhaust hole, a peripheral wall of the blocking member is flattened by the pressure of inflating gas in the airbag, thereby blocking the exhaust hole. Also, by the actuator releasing a holding of the leading end portion of the coupling member, the blocking member inverts in such a way as to be fed out to an outer side from the inner side of the airbag in a region of the exhaust hole by the pressure of the inflating gas, and discharges inflating gas from the tubular opened leading end portion, switching the exhaust hole to an opened state and causing the internal pressure of the airbag to decrease.

However, the existing configuration is such that as the blocking member is tubular when the exhaust hole is switched to an opened state, inflating gas can only be discharged from an aperture in the leading end after a whole of the blocking member is fed out to the outer side of the airbag, and there is room for improvement in a prompt discharge of inflating gas.

SUMMARY

An object of the invention is to provide an airbag device such that an airbag ensures good airtightness when an internal pressure adjustment exhaust hole is blocked, and an inflating gas can be discharged promptly when the exhaust hole is opened.

A representative configuration of an airbag device according to the invention is as follows.

The airbag device includes:

an airbag having, in a peripheral wall, an exhaust hole through which an inflating gas can be discharged in order to adjust internal pressure;

a blocking member, which is formed of a sheet material having flexibility and which can adjust the exhaust hole to a blocked state and an opened state;

a coupling member whose base portion side is coupled to the blocking member, the coupling member being inserted from an interior of the airbag to an exterior through an insertion hole formed in a peripheral edge of the exhaust hole of the airbag; and a holding and releasing unit, which maintains a state of blocking the exhaust hole by holding a leading end portion side of the coupling member, and causes a shift to a state of opening the exhaust hole by releasing the holding of the leading end portion side of the coupling member, wherein the blocking member in a state of blocking the exhaust hole includes:

a first panel portion that extends to the insertion hole side from the peripheral edge of the exhaust hole on an inner peripheral face side of the airbag, the first panel portion having a communication hole that communicates with the exhaust hole, and a peripheral edge of the communication hole being joined to the peripheral edge of the exhaust hole;

a second panel portion that coincides with a whole perimeter of an outer peripheral edge of the first panel portion and covers the exhaust hole and the first panel portion, the base portion side of the coupling member being coupled to leading end regions of outer peripheral edges of the first panel portion and the second panel portion in proximity to the insertion hole; and a through hole, formed between the leading end regions and the communication hole, through which inflating gas can be caused to flow, and wherein the blocking member blocks the exhaust hole owing to the first panel portion and the second panel portion, which are positioned one on the other, being pressed to the inner peripheral face side of the airbag on the peripheral edge of the exhaust hole by inflating gas when the holding and releasing unit is holding the leading end portion side of the coupling member, and inverts in such a way as to be fed out from the inner peripheral face side of the airbag to an outer peripheral face side through the exhaust hole and the communication hole owing to being pressed by inflating gas, causing inflating gas to be discharged from the through hole, when the holding and releasing unit releases the holding of the leading end portion side of the coupling member.

BRIEF DESCRIPTION OF THE DRAWINGS

FIG. 9 is a plan view showing materials configuring the airbag;

DESCRIPTION OF THE PREFERRED EMBODIMENTS

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

Figure 1:
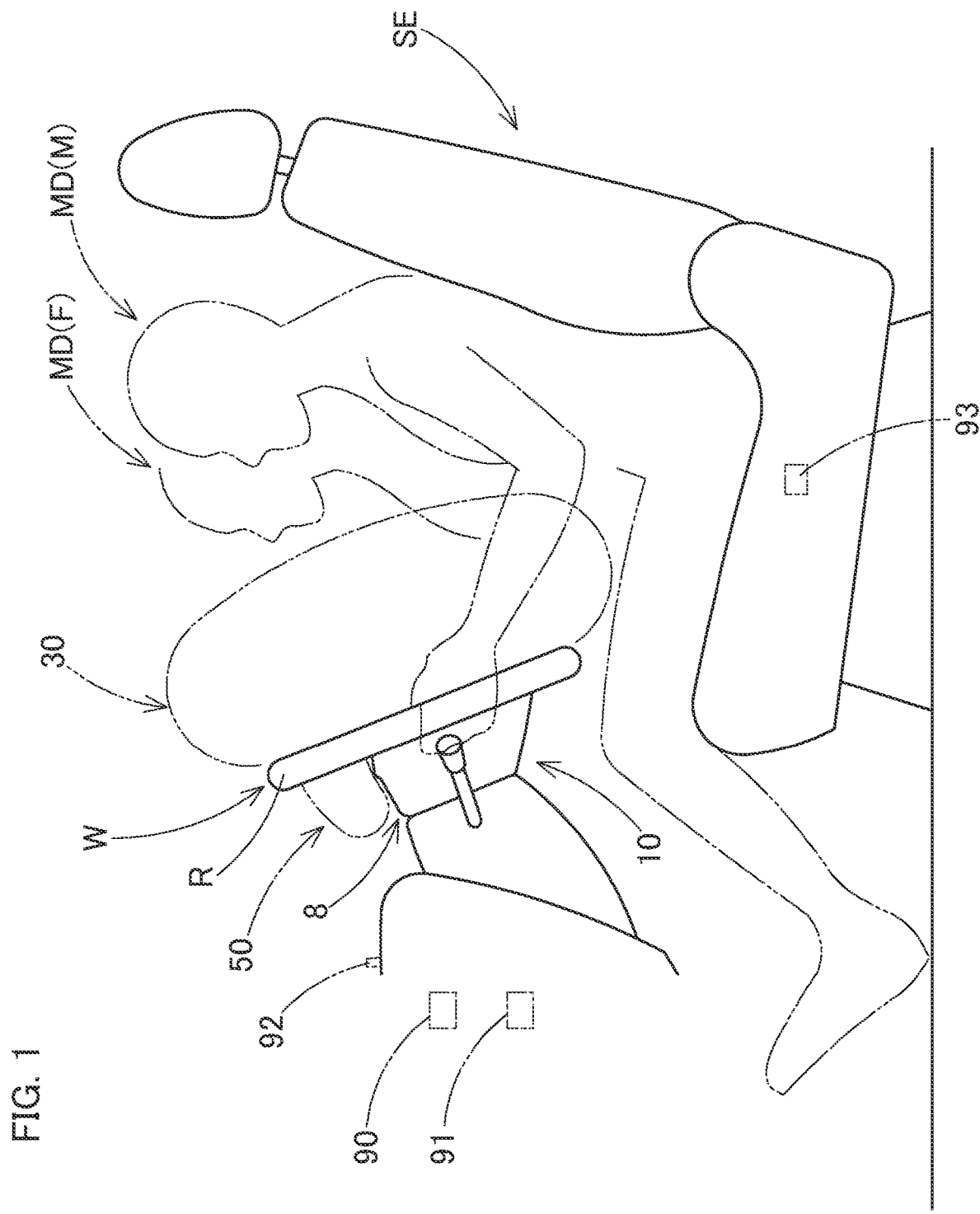
FIG. 1 is a side view showing a state in which an airbag device of an embodiment is mounted in a vehicle, wherein an airbag when inflation is completed is indicated by two-dot chain lines.
Figure 2:
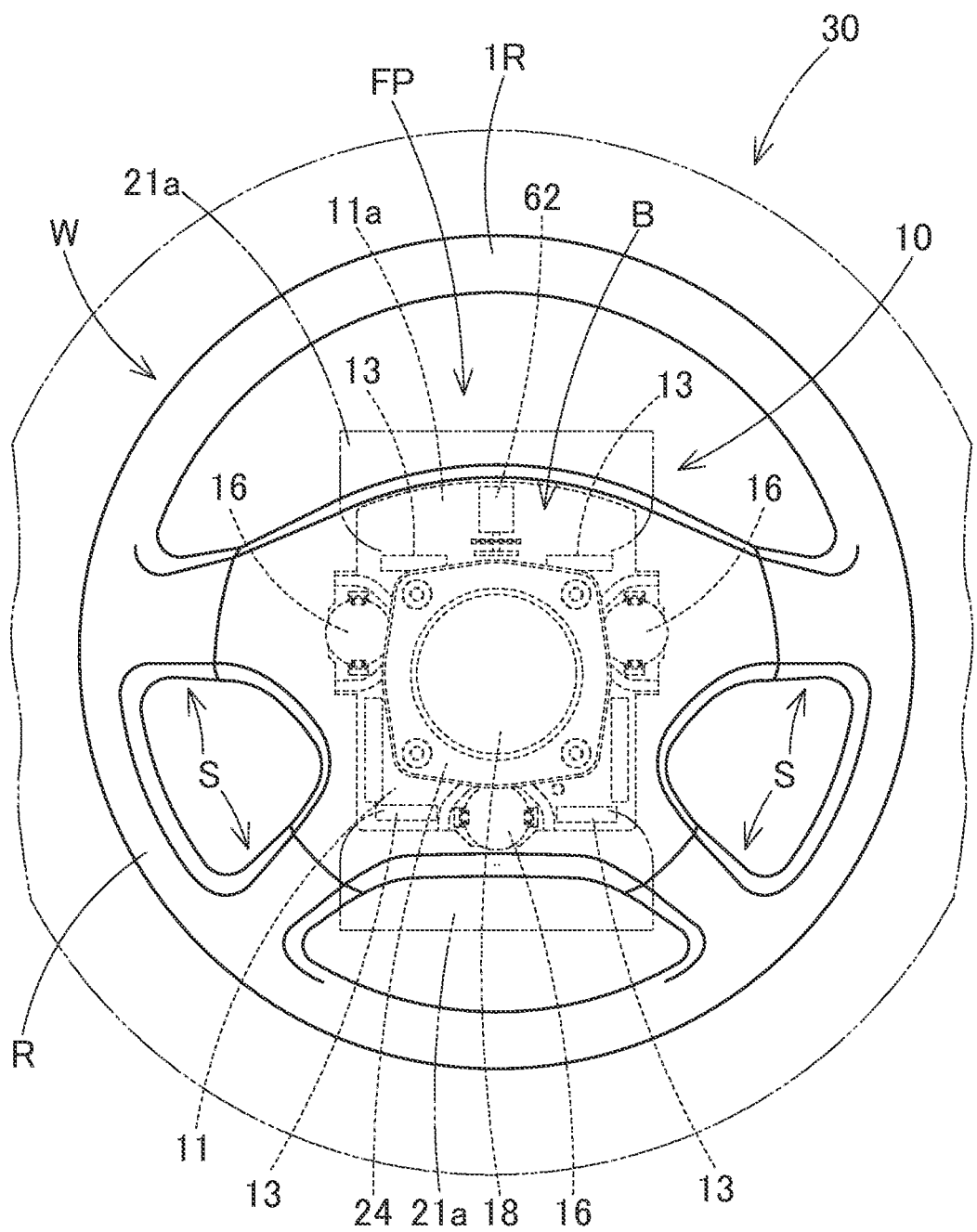
FIG. 2 is a schematic plan view of a steering wheel on which the airbag device is mounted.
Figure 3:
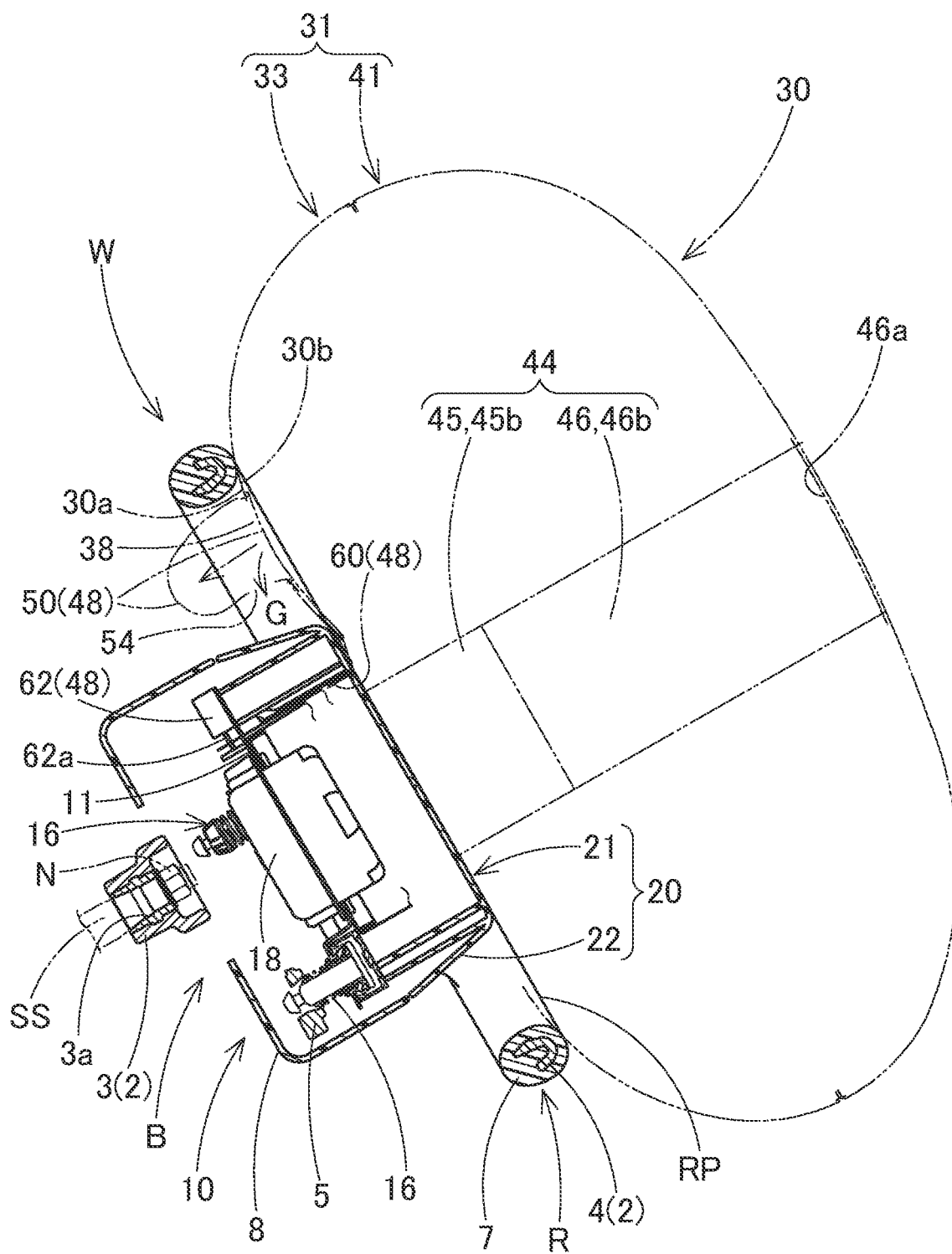
FIG. 3 is a schematic longitudinal sectional view of the steering wheel on which the airbag device is mounted.

Hereafter, one embodiment of the invention will be described, using the drawings. An airbag device 10 of the present embodiment is a driver's seat airbag device 10 mounted to a steering wheel W, as shown in FIGS. 1, 2, and 3. The steering wheel W includes a steering wheel main body 1 and the airbag device 10, which is disposed on an upper portion of a boss portion B in a center of the steering wheel main body 1. The steering wheel main body 1 includes a circular ring portion R, which is gripped when steering, the boss portion B, which is disposed in a center of the ring portion R and fastened to a steering shaft SS, and four spoke portions S that couple the boss portion B and the ring portion R.

In the following description, unless specifically stated otherwise, an up-down direction corresponds to an up-down direction along an axial direction of the steering shaft SS, a front-back direction corresponds to a front-back direction perpendicular to the axial direction of the steering shaft SS when a vehicle is steered straight ahead, and a left-right direction corresponds to a left-right direction perpendicular to the axial direction of the steering shaft SS when the vehicle is steered straight ahead.

The vehicle has a control device 90 that controls an operation of the airbag device 10, a collision detecting sensor 91 that detects a collision, a position detecting sensor 92 that detects a position of an occupant (driver) MD (M, F) seated in a seat SE, and a weight detecting sensor 93 that detects a body weight of the occupant (driver) MD (M, F). On detecting a collision of the vehicle based on a signal output from the collision detecting sensor 91, the control device 90 causes an inflator 18 to operate in order to cause an airbag 30 of the airbag device 10 to inflate. At this time, when determining, based on signals output from the position detecting sensor 92 and the weight detecting sensor 93, that an internal pressure of the airbag 30 is not to be reduced, the control device 90 controls in such a way as not to cause an actuator 62 of an internal pressure adjusting mechanism 48 to operate. Also, when determining, based on signals output from the position detecting sensor 92 and the weight detecting sensor 93, that the internal pressure of the airbag 30 is to be reduced, the control device 90 controls in such a way as to cause the actuator 62 of the internal pressure adjusting mechanism 48 to operate. For example, when the body weight of the driver MDF is light, or when the driver MDF is in proximity to the steering wheel W, the control device 90 determines that the internal pressure of the airbag 30 is to be reduced, and causes the actuator 62 to operate, thereby causing an inflating gas to be discharged from the airbag 30 in order to reduce the internal pressure of the airbag 30. For example, when the body weight of the driver MDF is heavy, or when the driver MDF is distanced from the steering wheel W, the control device 90 determines that the internal pressure of the airbag 30 is not to be reduced, and maintains the internal pressure of the airbag 30 without causing the actuator 62 to operate.

As shown in FIGS. 1, 2, and 3, the steering wheel main body 1 includes a metal core member 2, of an aluminum alloy or the like, that couples the ring portion R, the boss portion B, and the spoke portion S. A region of the core member 2 in the ring portion R (a ring core member portion 4) and a region on the ring portion R side of each spoke portion 4 are covered with a cover layer 7 made of a synthetic resin. A steel boss 3a for inserting the steering shaft SS and fixing with a nut N is disposed in a boss core member portion 3 of the core member 2 in the boss portion B. Also, a lower cover 8 made of a synthetic resin, which covers a portion below the boss portion B, is disposed in a lower portion of the steering wheel main body 1.

Figure 4:
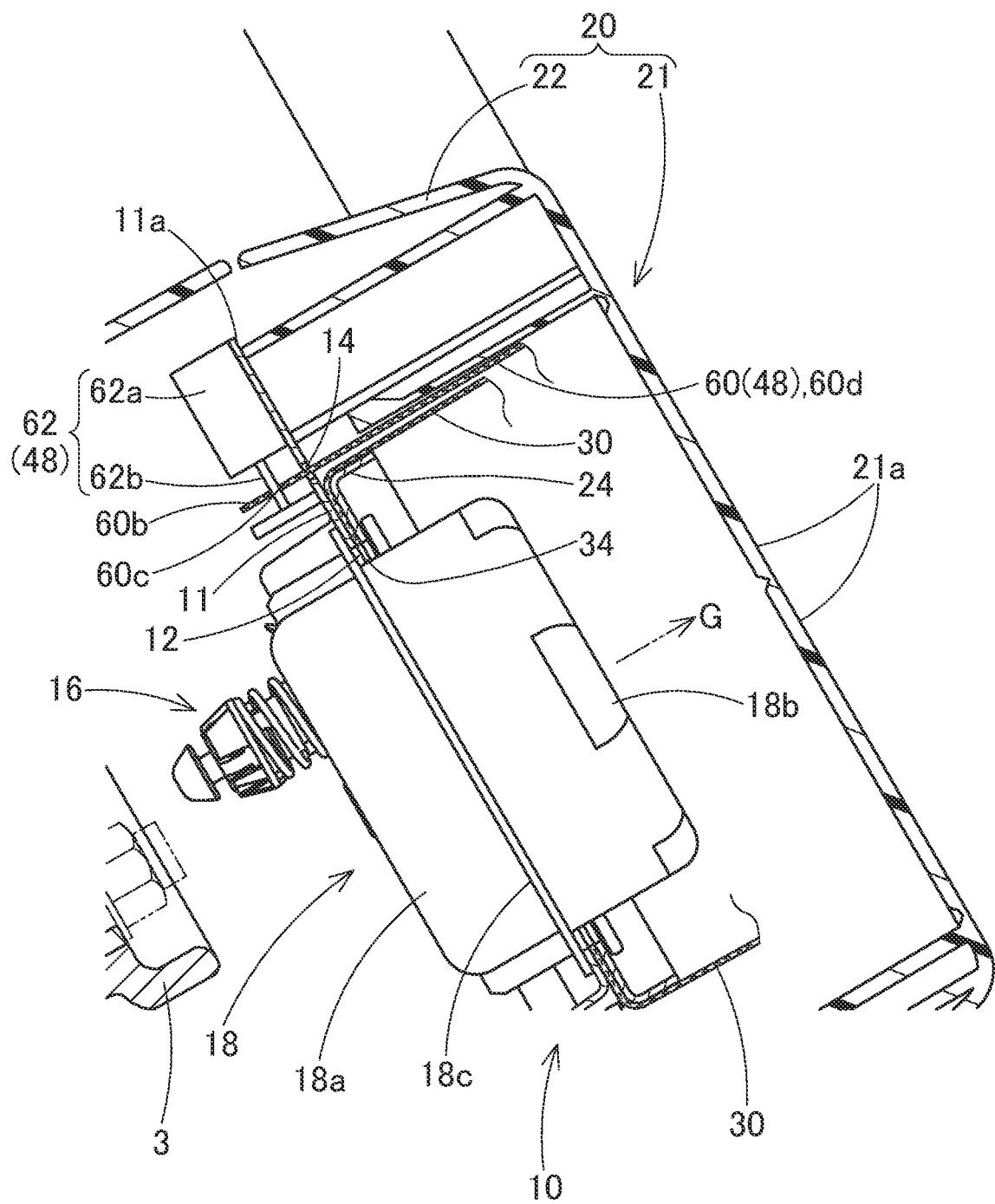
FIG. 4 is a schematic longitudinal sectional view showing a vicinity of an actuator acting as a holding and releasing unit of the airbag device.

As shown in FIGS. 3 and 4, the driver's seat airbag device 10 includes the airbag 30, which is folded and housed, and which inflates owing to inflating gas being caused to flow thereinto in such a way as to be capable of protecting the driver MD (M, F), the inflator 18, which supplies inflating gas to the airbag 30, an airbag cover 20 that covers a portion above the folded airbag 30, an attachment plate 11 that holds the airbag 30, the inflator 18, and the airbag cover 20, and a retainer 24 for attaching the airbag 30 to the attachment plate 11 together with the inflator 18. Also, the airbag device 10 includes the internal pressure adjusting mechanism 48, which can adjust the internal pressure of the inflated airbag 30. The internal pressure adjusting mechanism 48 includes a blocking member 50, a blocking tether 60 acting as a coupling member coupled to the blocking member 50, and the actuator 62, which acts as a holding and releasing unit that carries out a holding and a releasing of a holding of the blocking tether 60.

Figure 5:
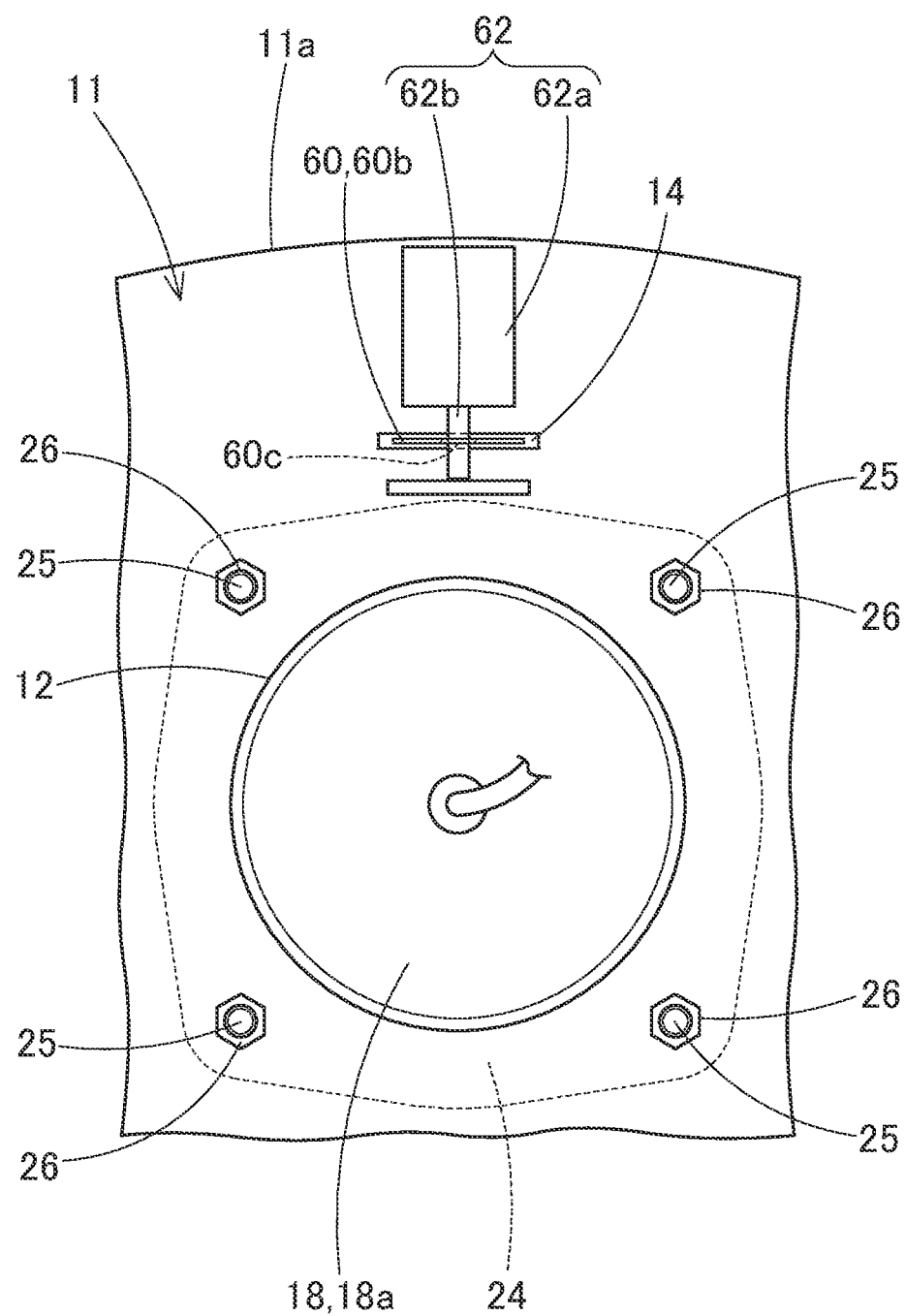
FIG. 5 is a schematic bottom view showing a vicinity of the actuator of the airbag device.
Figure 6:
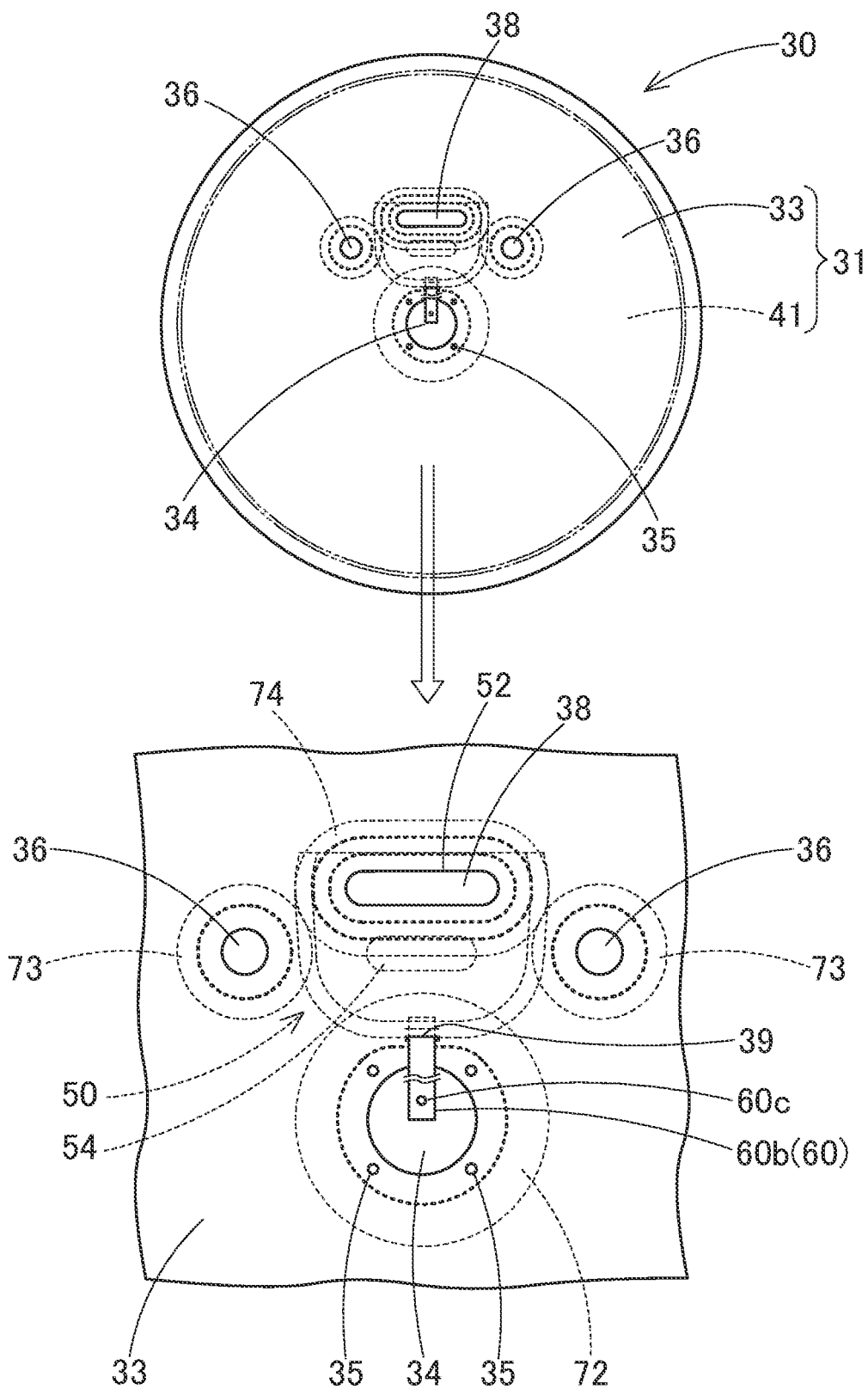
FIG. 6 is a bottom view showing the airbag of the airbag device in a flattened state.

The retainer 24 is a metal plate of a quadrilateral ring form. The retainer 24 is configured to include a bolt 25 fixed with a nut 26 to the attachment plate 11 in each of four corners (refer to FIG. 5) in such a way as to attach the airbag 30 to the attachment plate 11 by pressing a peripheral edge of an inflow aperture 34, to be described hereafter, of the airbag 30, and to attach the inflator 18 to the attachment plate 11.

The inflator 18 includes a cylindrical main body portion 18a, which includes a multiple of gas discharge ports 18b in an upper portion thereof, and a flange portion 18c protruding from an outer peripheral face of the main body portion 18a. Through holes (not shown) through which the bolts 25 of the retainer 24 are caused to pass are formed in the flange portion 18c.

As shown in FIGS. 2 and 3, the attachment plate 11 is a metal plate of an approximately rectangular form, is disposed in an upper portion of the boss portion B of the steering wheel W, and is a member to which the folded airbag 30, the inflator 18, and the airbag cover 20 are attached. An insertion hole 12 into which the main body portion 18a of the inflator 18 can be inserted from below is opened in a circular form in the attachment plate 11. A through hole (not shown) through which the bolt 25 of the retainer 24 is passed is formed in a periphery of the through hole 12 of the attachment plate 11. Also, a multiple (three in the embodiment) of engagement legs 16 for attaching the airbag device 10 to an attachment portion 5 of the steering wheel main body 1 are attached to the attachment plate 11. Each engagement leg 16 is configured in such a way as to incorporate a horn switch mechanism, and when an operation of pressing the airbag device 10 down is carried out after the airbag device 10 is attached to the steering wheel main body 1, a horn provided in the vehicle can be operated. The engagement leg 16 is attached to the attachment portion 5, which is provided in the boss core member portion 3 of the steering wheel main body 1. By so doing, the airbag device 10 is attached to the steering wheel main body 1.

Also, the actuator 62 of the internal pressure adjusting mechanism 48 is fixed to a back face of a front edge 11a side of the attachment plate 11. Also, an insertion hole 14 for inserting the blocking tether 60, which is engaged with an engagement pin 62b of the actuator 62, through is provided in the attachment plate 11 (refer to FIGS. 4 and 5).

Also, the attachment plate 11 includes a multiple of engagement holes 13 in which unshown engagement legs extending from a side wall portion 22 of the airbag cover 20 are engaged. The airbag cover 20 is engaged with the engagement holes 13, and held by the attachment plate 11.

The airbag cover 20 is made of a synthetic resin, and includes a ceiling wall portion 21, which covers a portion above the airbag 30 folded and housed, and a side wall portion 22, of an approximately square tube form, that extends downward from a vicinity of an outer peripheral edge of the ceiling wall portion 21. Two door portions 21a, which open at both front and back sides owing to being pushed by the inflating airbag 30, are formed in the ceiling wall portion 21 (refer to FIG. 2). As already described, engagement legs (not shown) engaged in the engagement holes 13 of the attachment plate 11 are disposed at a lower end of the side wall portion 22.

The airbag 30 is formed of a fabric obtained by weaving strands of a polyamide, polyester, or the like. As indicated by two-dot chain lines in FIGS. 1 and 2, a form of the airbag 30 when inflation is completed is configured in such a way as to be circular when seen from above, and approximately elliptical when seen from a side. An outer peripheral wall 31 of the airbag 30 includes a vehicle body side wall portion 33 on the steering wheel main body 1 side (the ring portion R side) and a driver side wall portion 41 on the driver MD side.

The vehicle body side wall portion 33 and the driver side wall portion 41 are both circular, and have identical external forms (refer to FIG. 9). An inflow aperture 34 opened in a circular form, for causing inflating gas to flow in, is formed in a center of the vehicle body side wall portion 33. The outer peripheral wall 31 is formed by outer peripheral edges of the vehicle body side wall portion 33 and the driver side wall portion 41 being sewn together. Also, attachment holes 35 through which the bolts 25 of the retainer 24 for attaching the airbag 30 to the attachment plate 11 are caused to pass are formed in a peripheral edge of the inflow aperture 34 (refer to FIG. 9).

A reinforcing fabric 72 is sewn to the peripheral edge of the inflow aperture 34, and the inflow aperture 34 and the attachment holes 35 are also formed in the reinforcing fabric 72.

Also, two thickness regulating tethers 44 that couple the vehicle body side wall portion 33 and the driver side wall portion 41 are provided in the airbag 30 in order to regulate a distance between the vehicle body side wall portion 33 and the driver side wall portion 41 when inflating. The thickness regulating tether 44 is formed by an arm portion 45b, which extends from both sides of a circular central portion 45a of a lower side portion 45 sewn to the peripheral edge of the inflow aperture 34 of the vehicle body side wall portion 33, and an arm portion 46b, which extends from both sides of a disk-shaped central portion 46a of an upper side portion 46 sewn to a central portion 42 of the driver side wall portion 41, being sewn together. In the case of the embodiment, the central portion 45a of the lower side portion 45 is also used as the reinforcing fabric 72.

Figure 10A:
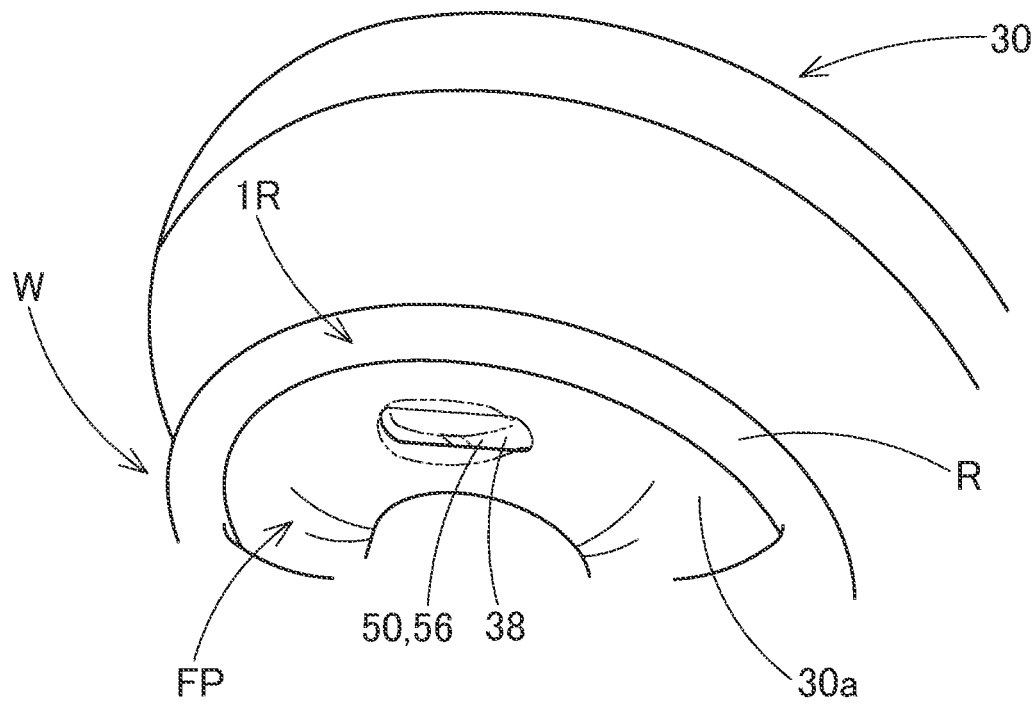
FIGS. 10A and 10B are schematic views showing a blocked state and an opened state of the exhaust hole when the airbag device is operating.
Figure 10B:
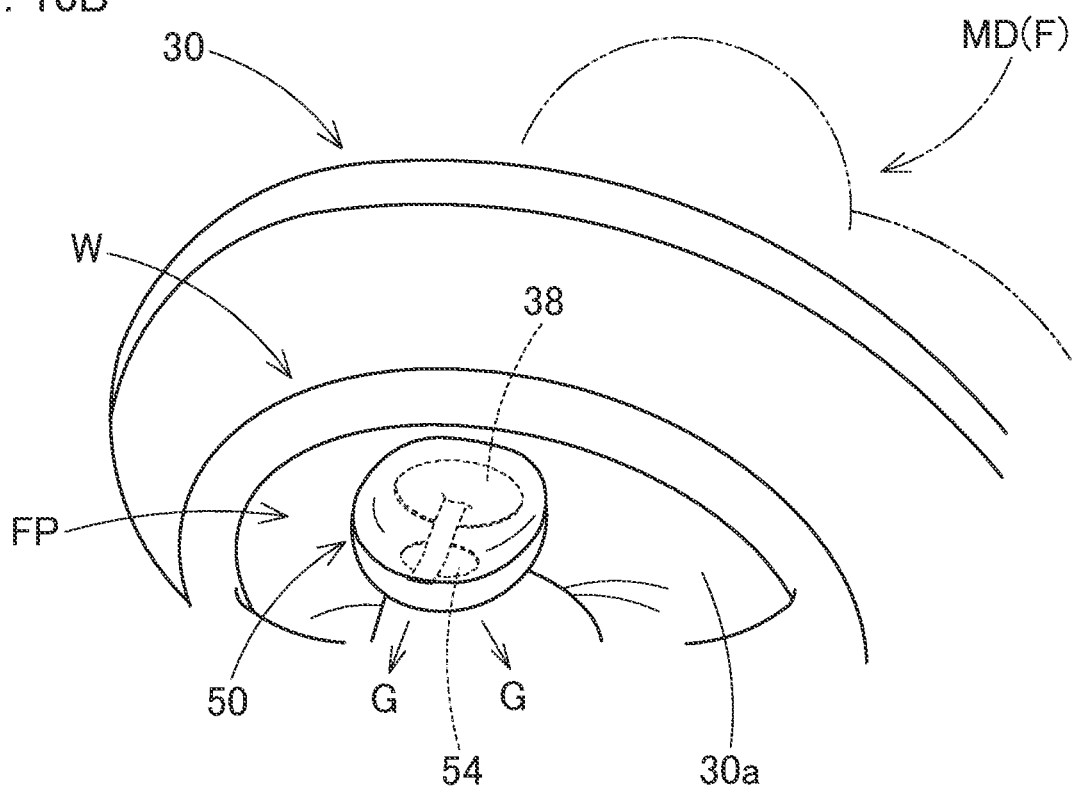

Also, two gas release holes 36 (vent holes) and an exhaust hole 38 (a variable vent hole) are provided in the vehicle body side wall portion 33. The gas release hole 36 is a hole for releasing inflating gas in order to restrict a sudden rise in internal pressure in the airbag 30 when inflating gas flows in, is disposed on the left and right on a front portion side of the vehicle body side wall portion 33, and is opened in a circular form. The exhaust hole 38 is a hole through which inflating gas can be discharged in order to adjust the internal pressure of the airbag when inflating, is disposed in a left-right direction center on a front portion side of the inflow aperture 34, and is opened in an approximately elliptical form extended in the left-right direction. Furthermore, an insertion hole 39, which is a slit-form aperture through which the blocking tether 60 is inserted, is provided in a position between the exhaust hole 38 and the inflow aperture 34 in the vehicle body side wall portion 33. The exhaust hole 38 is set in such a way as to be disposed in a space FP between a front side portion 1R of the ring portion R of the steering wheel W and the boss portion B when inflation of the airbag 30 is completed (refer to FIGS. 10A and 10B). Also, reinforcing fabrics 73 and 74 are sewn to peripheral edges of the gas release hole 36 and the exhaust hole 38 respectively.

The blocking member 50 configuring the internal pressure adjusting mechanism 48 is disposed on a peripheral edge of the exhaust hole 38 on an inner peripheral face 30b side of the airbag 30. The blocking member 50 is formed of the same kind of fabric (a sheet material) having flexibility, such as a polyamide, as the airbag 30. As shown in FIGS. 6 to 8C, the blocking member 50 includes, in a state of blocking the exhaust hole 38, a first panel portion 51, which extends from the peripheral edge of the exhaust hole 38 toward the insertion hole 39 at the rear thereof on the inner peripheral face 30b side of the airbag 30, and a second panel portion 56, which is of the same external form as the first panel portion 51, coincides with a whole circumference of an outer peripheral edge 51a of the first panel portion 51, and is disposed in such a way as to cover the exhaust hole 38 and the first panel portion 51. A base portion 60a side of the blocking tether 60 is coupled to a leading end region 50b of the blocking member 50 in proximity to the insertion hole 39. The blocking tether 60 is coupled between the first panel portion 51 and the second panel portion 56 when outer peripheral edges 55a and 56a of the first panel portion 51 and the second panel portion 56 are joined together.

The first panel portion 51 has a communication hole 52 that communicates with the exhaust hole 38, and is joined to a peripheral edge of the exhaust hole 38, with a peripheral edge of the communication hole 52 as a joint portion 53. Also, a through hole 54 through which inflating gas can pass is formed in the first panel portion 51, penetrating front and back, in a position between a leading end region 51c (50b) coupled to the blocking tether 60 and the communication hole 52.

The through hole 54 is provided in a position in the first panel portion 51 when flattened that is in proximity to the communication hole 52 between the leading end region 51c and the communication hole 52. As a ratio (H0:H1) of a distance H0 between the communication hole 52 and the through hole 54 to a distance H1 between the leading end region 51c and the through hole 54 is 1:1.5, the through hole 54 is nearer to the communication hole 52 side than to the leading end region 51c (refer to FIGS. 11A and 11B). Also, in a state wherein the first panel portion 51 is flattened, the through hole 54 is of an elliptical form extended in a direction WD perpendicular to a disposition direction SD of the leading end region 51c and the communication hole 52.

Figure 7:
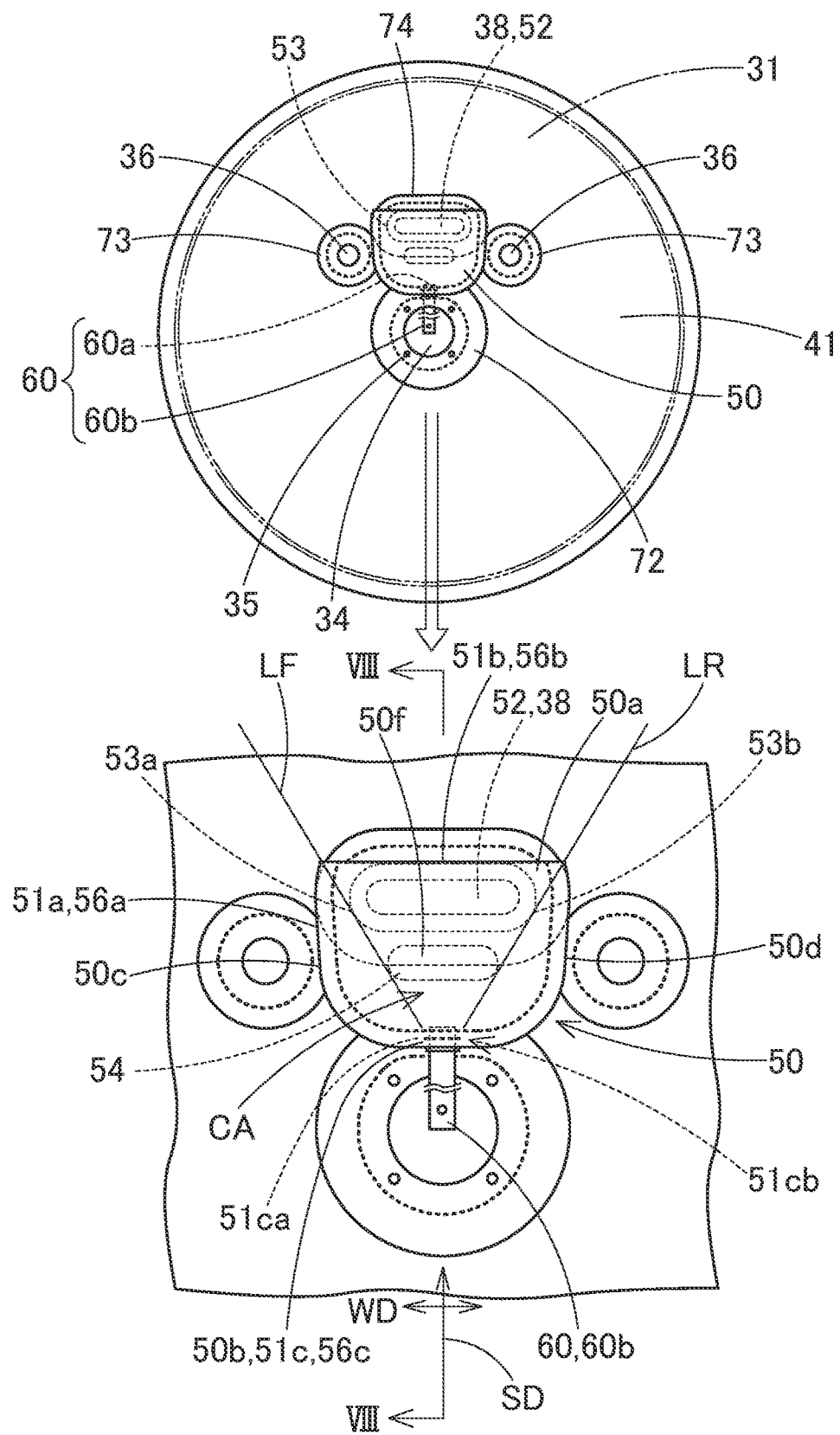
FIG. 7 is an exploded view of a blocking member seen from an inner peripheral face side of the airbag in a state wherein the airbag of the airbag device is flattened.
Figure 8A:
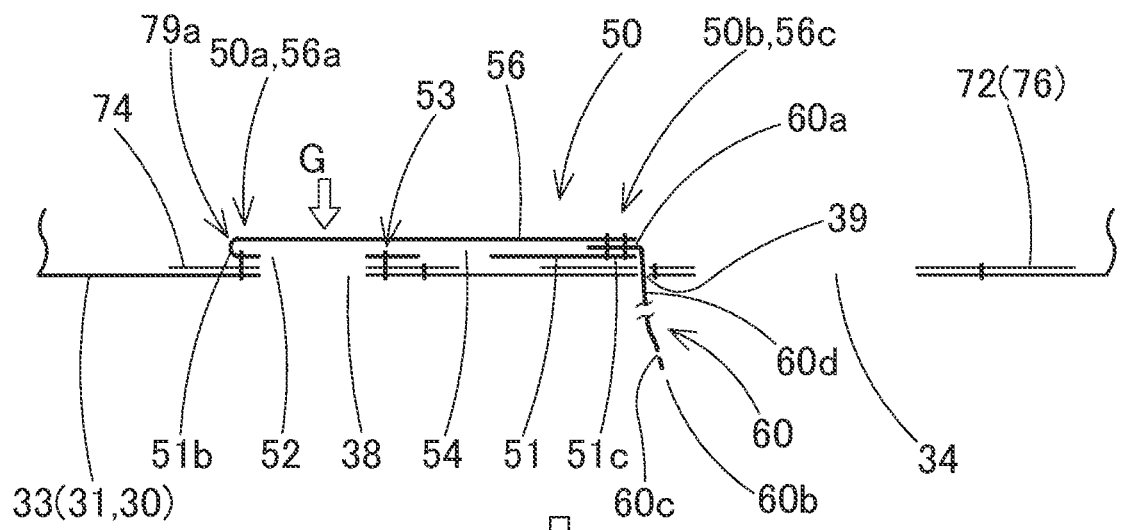
FIGS. 8A, 8B, and 8C are schematic sectional views of a VIII-VIII region of FIG. 7, and collectively show a state of shifting from a blocked state of an exhaust hole to an opened state.
Figure 8B:
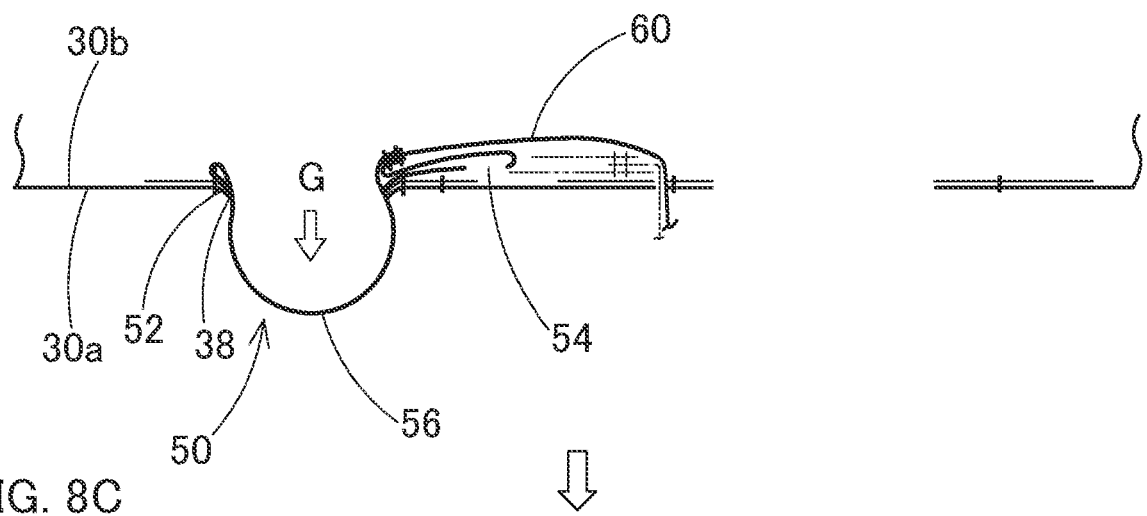
Figure 8C:
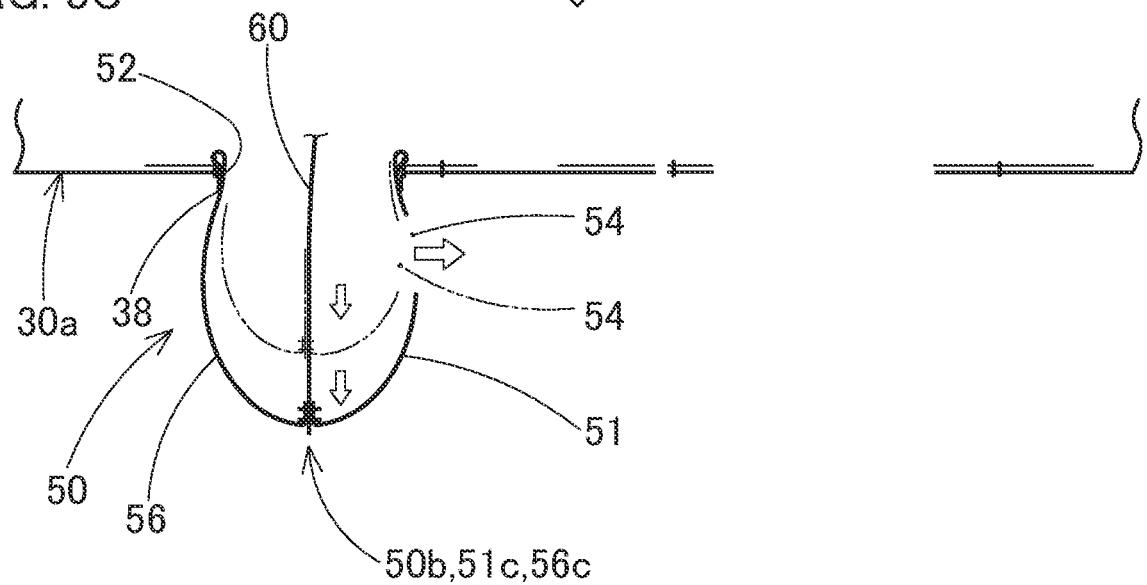

Also, in a state wherein the first panel portion 51 is flattened, the through hole 54 is disposed in a region CA between straight lines LF and LR, one on either side, which link two edges 53a and 53b of the joint portion 53, which is joined to the peripheral edge of the exhaust hole 38, in the width direction WD along a direction perpendicular to the disposition direction SD of the leading end region 51c and the communication hole 52, and two edges 51ca and 51cb of a region communicating with a blocking tether 60 in the leading end region 51c, respectively (refer to FIG. 7).

In the embodiment, the blocking member 50 is formed of one sheet-form blocking member base fabric 79, which is formed of a fabric such as a polyamide, as shown in FIG. 9. The blocking member 50 is formed by, when the blocking member base fabric 79 is folded in two along a crease 79a, a first panel region 80 that forms the first panel portion 51 and a second panel region 81 that forms the second panel portion 56, which are of the same form, being positioned one on the other, and the outer peripheral edges 51a and 56a of the first panel portion 51 excepting the crease 79a and the second panel portion 56 being sewn together. The peripheral edge of the communication hole 52 of the first panel portion 51 is joined by sewing to the peripheral edge of the exhaust hole 38 before the outer peripheral edges 51a and 56a are sewn together, and when the outer peripheral edges 51a and 56a are sewn together, the base portion 60a of the blocking tether 60 is also sewn to the leading end region 50b, whereby the blocking tether 60 is coupled to the blocking member 50.

The blocking tether 60 is a strip-form member formed of a fabric (a sheet material) having flexibility, such as a polyamide. The base portion 60a, which is one end portion of the blocking tether 60, is joined to the leading end region 50b of the blocking member 50, and a leading end portion 60b, which is another end portion, is held by the actuator 62. An engagement hole 60c into which the engagement pin 62b of the actuator 62 is inserted is formed in the leading end portion 60b. The blocking tether 60 is held by the actuator 62 owing to the engagement pin 62b of the actuator 62 being inserted into and engaged by the engagement hole 60c, and the holding by the actuator 62 is released by the engagement pin 62b being removed from the engagement hole 60c. Also, an intermediate portion 60d of the blocking tether 60 is inserted through the insertion hole 39 of the airbag 30, and the leading end portion 60b side is inserted through the insertion hole 14 of the attachment plate 11. By so doing, the blocking tether 60 is inserted via the insertion hole 39 from the inner peripheral face 30b side (an interior) of the airbag 30 to an outer peripheral face 30a side (an exterior), and engaged to the engagement pin 62b of the actuator 62.

The actuator 62 incorporates a micro gas generator, and on receiving an operation signal from the control device 90, instantaneously operates in such a way as to draw in the engagement pin 62b protruding from a main body 62a. On the engagement pin 62b being drawn in, the engagement pin 62b comes out of the engagement hole 60c, and the holding of the blocking tether 60 by the actuator 62 is released.

As shown in FIG. 9, materials configuring the airbag 30 are a vehicle body side base fabric 70 configuring the vehicle body side wall portion 33, a driver side base fabric 71 configuring the driver side wall portion 41, the reinforcing fabrics 72, 73, and 74, a lower side portion 76 and an upper side portion 77 configuring the thickness regulating tether 44, the blocking member base fabric 79 configuring the blocking member 50, and a coupling member base fabric 83. Manufacturing of the airbag 30 is such that, firstly, the lower side portion 76 doubling as the reinforcing fabric 72, and the reinforcing fabrics 73 and 74, are sewn to an inner peripheral side of the vehicle body side base fabric 70 forming the vehicle body side wall portion 33. Also, the blocking member base fabric 79 is sewn to a position that is to become the exhaust hole 38, and the inflow aperture 34, the attachment hole 35, the gas release hole 36, the exhaust hole 38, and the insertion hole 39 are formed by a hole opening process. When implementing the hole opening process for the exhaust hole 38, the communication hole 52 is formed in the blocking member base fabric 79. Also, the through hole 54 is formed in advance in the blocking member base fabric 79.

Next, the crease 79a of the blocking member base fabric 79 is applied, and the first panel region 80 and the second panel region 81 are positioned one on the other. At this time, the base portion 60a of the blocking tether 60 is disposed between the first panel region 80 and the second panel region 81, and the outer peripheral edges 51a and 56a are sewn together, thereby forming the blocking member 50 to which the blocking tether 60 is coupled. The leading end portion 60b side of the blocking tether 60 is extruded to an outer surface side of the vehicle body side base fabric 70 from the insertion hole 14.

Next, outer surface sides of the driver side base fabric 71, to which the upper side portion 77 of the upper side portion 46 of the thickness regulating tether 44 is sewn, with an upper side portion reinforcing fabric 75 interposed in advance, and the vehicle body side base fabric 70 are brought together, and outer peripheral edges are sewn together, and the driver side base fabric 71 and the vehicle body side base fabric 70 are caused to invert utilizing the inflow aperture 34. By so doing, the outer peripheral wall 31 of the airbag 30 is formed. Subsequently, utilizing the inflow aperture 34, the airbag 30 can be manufactured by the arm portions (45b and 46b) 76b and 77b of the lower side portion (45) 76 and the upper side portion (46) 77 being sewn together.

When assembling the airbag device 10 and mounting the airbag device 10 in a vehicle, firstly, the retainer 24 is placed inside the airbag 30 in such a way as to cause the bolts 25 of the retainer 24 to protrude from the attachment holes 35. Next, the airbag 30 is folded, and the airbag 30 is wrapped in a predetermined unfolding preventing material in order that the airbag 30 does not become unfolded. The leading end portion 60b side of the blocking tether 60, which is outside the airbag 30, is withdrawn from the unfolding preventing material.

Next, the airbag 30 is placed on the attachment plate 11, while causing the bolts 25 of the retainer 24 to protrude from the attachment plate 11, and extruding the leading end portion 60b side of the blocking tether 60 to a back face side of the attachment plate 11 from the insertion hole 14. Further, the main body portion 18a of the inflator 18 is inserted into the insertion hole 12 from below, the bolts 25 of the retainer 24 are caused to penetrate the flange portion 18c, and the nuts 26 are fastened to the bolts 25. By so doing, the airbag 30 and the inflator 18 can be attached to the attachment plate 11.

Next, the engagement pin 62b of the actuator 62 is inserted into the engagement hole 60c of the leading end portion 60b of the blocking tether 60. Also, the attachment plate 11 is covered with the airbag cover 20, and the engagement legs (not shown) of the airbag cover 20 are caused to engage with the engagement holes 13 of the attachment plate 11, whereby the airbag cover 20 is attached to the attachment plate 11. By so doing, the airbag device 10 can be assembled. A state wherein the blocking tether 60 is caused to be held by the actuator 62 is an initial state of the airbag device 10, and the blocking member 50 in this state blocks the exhaust hole 38 on the inner peripheral face 30b side of the airbag 30.

Also, the airbag device 10 can be mounted in the vehicle by the engagement legs 16 being caused to engage one each with the attachment portions 5 of the steering wheel main body 1, which is fastened in advance to the steering shaft SS, and the airbag device 10 being attached to the steering wheel main body 1. At this time, an operation signal line extending from the control device 90 is connected to the inflator 18 or the actuator 62.

The driver's seat airbag device 10 of the embodiment is such that, firstly, a collision of the vehicle is detected by the collision detecting sensor 91, and a signal is input into the control device 90 from the collision detecting sensor 91, whereby the inflator 18 is caused to operate by the control device 90. Because of this, an inflating gas G is discharged from the gas discharge port 18b of the inflator 18, and the airbag 30 inflates owing to the inflating gas G. The inflated airbag 30 pushes and opens the door portions 21a, 21a of the airbag cover 20, protrudes from the airbag cover 20, and covers an upper face RP side of the ring portion R, as shown by the two-dot chain lines in FIGS. 1 and 2.

At this time, when the control device 90 determines, based on a signal output from the position detecting sensor 92 or the weight detecting sensor 93, that the internal pressure of the airbag 30 is not to be reduced, the control device 90 does not cause the actuator 62 to operate. Because of this, the actuator 62 does not release the holding of the blocking tether 60, meaning that the blocking member 50 maintains the state of blocking the exhaust hole 38. That is, in a state wherein the exhaust hole 38 is blocked, the actuator 62 holds the leading end portion 60b of the blocking tether 60, the blocking member 50 is pulled by the blocking tether 60, and the blocking member 50 covers and blocks the exhaust hole 38 owing to the first panel portion 51 and the second panel portion 56, which are positioned one on the other, being pressed by the inflating gas G to the inner peripheral face 30b side of the airbag 30 on the peripheral edge of the exhaust hole 38 (refer to FIGS. 8A and 10A). At this time, the through hole 54 of the first panel portion 51, wherein the blocking member 50 itself is opened, is also blocked by a peripheral edge thereof being pressed to the inner peripheral face 30b side of the airbag 30, because of which it is difficult for the inflating gas G to flow into the tubular blocking member 50 from the through hole 54. Also, even supposing that the inflating gas G flows into the blocking member 50 from the through hole 54, the peripheral edge of the exhaust hole 38 is pressed against the second panel portion 56, because of which a discharge of the inflating gas G from the exhaust hole 38 is restricted, and good airtightness when the exhaust hole 38 is blocked is secured.

Also, when the control device 90 determines, based on a signal output from the position detecting sensor 92 or the weight detecting sensor 93, that the internal pressure of the airbag 30 is to be reduced when the inflator 18 operates, the control device 90 causes the actuator 62 to operate. Because of this, the actuator 62 releases the holding of the blocking tether 60, and the blocking member 50 causes the exhaust hole 38 to be opened. That is, in a state wherein the exhaust hole 38 is opened, the holding of the blocking tether 60 by the actuator 62 is released, the blocking member 50 is subjected to the pressure of the inflating gas G without being pulled by the blocking tether 60, and is fed out in such a way as to invert from the inner peripheral face 30b side of the airbag 30 to the outer peripheral face 30a side through the exhaust hole 38 and the communication hole 52 (refer to FIGS. 8B, 8C and 10B). At this time, the through hole 54 is exposed on the outer peripheral face 30a side of the airbag 30 before a whole region of the blocking member 50 from the peripheral edge of the exhaust hole 38 to the leading end region 50b is fed out to the outer peripheral face 30a side of the airbag 30, because of which the inflating gas G is promptly discharged from the through hole 54, whereby the internal pressure of the airbag 30 can be reduced.

Consequently, according to the airbag device 10 of the embodiment, the inflating gas G can be discharged promptly when the exhaust hole 38 is opened, while good airtightness of the airbag 30 is secured when the internal pressure adjustment exhaust hole 38 is blocked.

Also, the through hole 54 of the first panel portion 51 is disposed in a position in proximity to the communication hole 52 between the leading end region 50b and the communication hole 52 in the flattened first panel portion 51. This means that when the blocking member 50 inverts when the inflating gas G is discharged, and the through hole 54 is exposed on the outer peripheral face 30a side of the airbag 30, the through hole 54 is more easily exposed on the outer peripheral face 30a side of the airbag 30 by a degree equivalent to the proximity to the communication hole 52 communicating with the exhaust hole 38, and the inflating gas G can be discharged still more promptly.

Figure 11A:
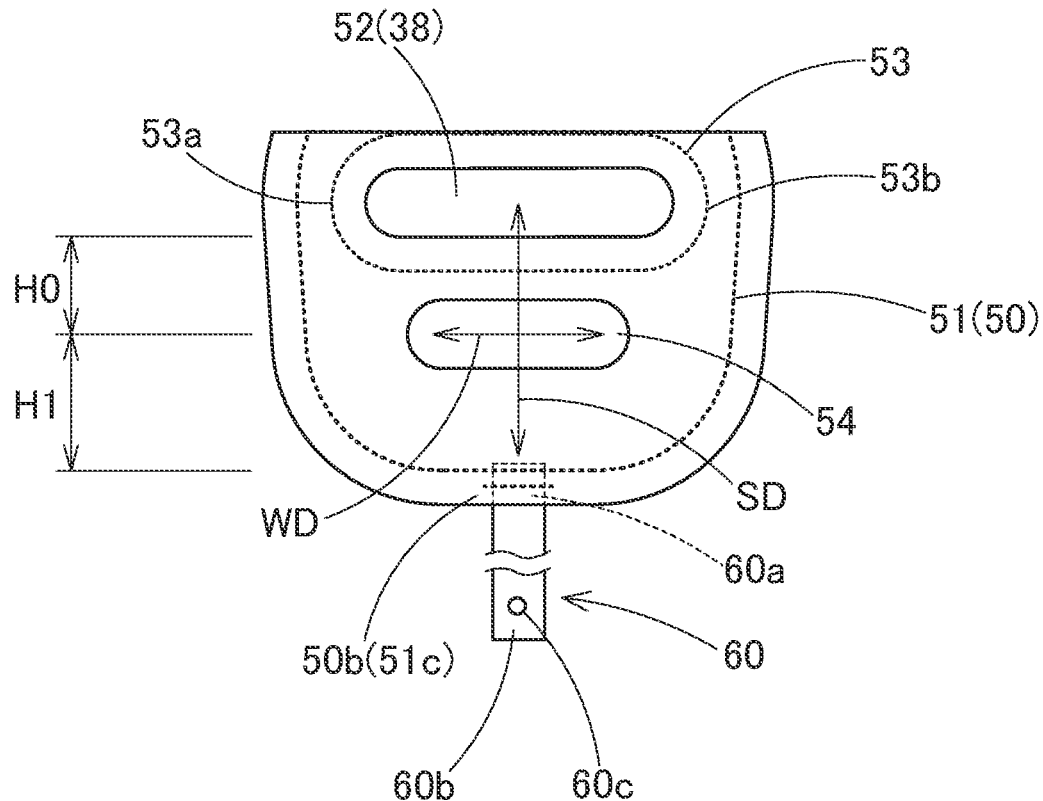
FIGS. 11A and 11B are drawings illustrating an opened state of a through hole of the blocking member.
Figure 11B:
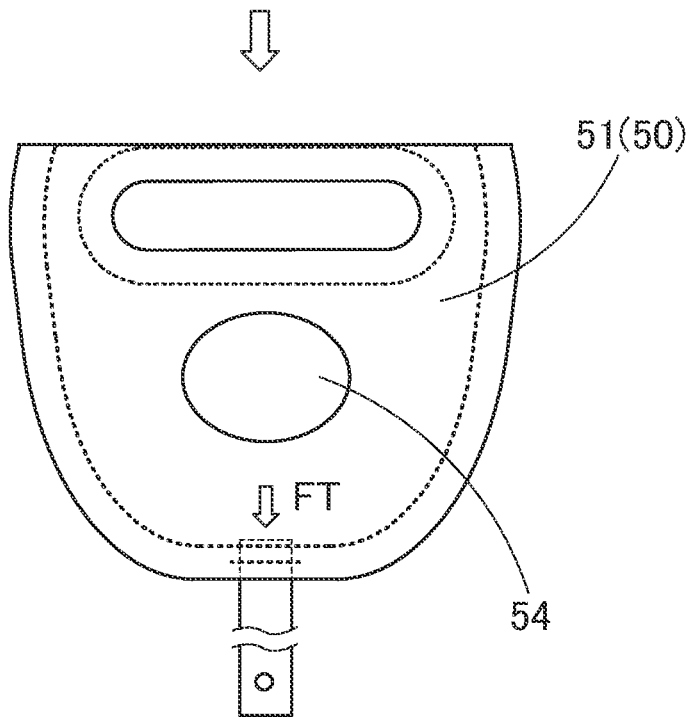

Also, in a state wherein the first panel portion 51 is flattened, the through hole 54 is of an elliptical form extended in the direction WD perpendicular to the disposition direction SD of the leading end region 50b and the communication hole 52. When the inflating gas G is discharged from the through hole 54, the blocking member 50 attempts to extend by causing the leading end region 50b side to invert to the outer peripheral face 30a side of the airbag 30, as shown in FIGS. 11A and 11B, meaning that owing to this kind of configuration being employed, a tensile force TF acts in the disposition direction SD of the leading end region 50b and the communication hole 52, the elliptical through hole 54 spreads into an approximately circular form in such a way as to increase an opening area, and the inflating gas G can be discharged efficiently. Of course, when the exhaust hole 38 is blocked, the through hole 54 is of an elliptical form with a small opening area, and is pressed to the inner peripheral face 30b side of the airbag 30, because of which airtightness of the inflating gas G in the airbag 30 is secured easily.

Also, in a state wherein the first panel portion 51 is flattened, the exhaust hole 38 is disposed in the region CA between the straight lines LF and LR, one on either side, that link the two edges 53a and 53b of the joint portion 53, which is joined to the peripheral edge of the exhaust hole 38, in the width direction WD along a direction perpendicular to the disposition direction SD of the leading end region 50b and the communication hole 52, and the two edges 51ca and 51cb of a region communicating with the blocking tether 60 in the leading end region 50b, respectively. When the exhaust hole 38 is blocked, the blocking tether 60 is held by the actuator 62, and the blocking member 50 is pulled by the blocking tether 60 from the peripheral edge of the exhaust hole 38 to the leading end region 50b. At this time, the blocking member 50 is such that tension acts on two edges 50c and 50d in the width direction WD, and tension is restricted in a vicinity of a central portion 50f in the width direction, because of which the blocking member 50, being subjected to the pressing force of the inflating gas G, attains a state wherein the central portion 50f between the two edges 50c and 50d in the width direction is slack, is pressed to the inner peripheral face 30b side of the airbag 30, and comes into close contact easily. This means that by the exhaust hole 38 being disposed in the central portion 50f between the two edges 50c and 50d in the width direction, leaking of inflating gas from the exhaust hole 38 is still further restricted, and airtightness when the exhaust hole 38 is blocked is secured easily.

Although the invention has been described with the driver's seat airbag device 10 as an example in the embodiment, the invention is not limited to this. That is, provided that a configuration is such that an exhaust hole for adjusting internal pressure of an airbag when inflation is completed is provided, the invention can also be applied to another airbag device, such as a passenger seat airbag device.

What is claimed is:

1. An airbag device, comprising:
   an airbag having, in a peripheral wall, an exhaust hole through which an inflating gas can be discharged in order to adjust internal pressure;
   a blocking member, which is formed of a sheet material having flexibility and which can adjust the exhaust hole to a blocked state and an opened state;
   a coupling member whose base portion side is coupled to the blocking member, the coupling member being inserted from an interior of the airbag to an exterior through an insertion hole formed in a peripheral edge of the exhaust hole of the airbag; and
   a holding and releasing unit, which maintains a state of blocking the exhaust hole by holding a leading end portion side of the coupling member, and causes a shift to a state of opening the exhaust hole by releasing the holding of the leading end portion side of the coupling member, wherein
   the blocking member in a state of blocking the exhaust hole includes:
   a first panel portion that extends to the insertion hole side from the peripheral edge of the exhaust hole on an inner peripheral face side of the airbag, the first panel portion having a communication hole that communicates with the exhaust hole, and a peripheral edge of the communication hole being joined to the peripheral edge of the exhaust hole;
   a second panel portion that coincides with a whole perimeter of an outer peripheral edge of the first panel portion and covers the exhaust hole and the first panel portion, the base portion side of the coupling member being coupled to leading end regions of outer peripheral edges of the first panel portion and the second panel portion in proximity to the insertion hole; and
   a through hole, formed between the leading end regions and the communication hole, through which inflating gas can be caused to flow, and wherein
   the blocking member
   blocks the exhaust hole owing to the first panel portion and the second panel portion, which are positioned one on the other, being pressed to the inner peripheral face side of the airbag on the peripheral edge of the exhaust hole by inflating gas when the holding and releasing unit is holding the leading end portion side of the coupling member, and
   inverts in such a way as to be fed out from the inner peripheral face side of the airbag to an outer peripheral face side through the exhaust hole and the communication hole owing to being pressed by inflating gas, causing inflating gas to be discharged from the through hole, when the holding and releasing unit releases the holding of the leading end portion side of the coupling member.

2. The airbag device according to claim 1, wherein the through hole is disposed in a position in proximity to the communication hole between the leading end region and the communication hole in the first panel portion when flattened.

3. The airbag device according to claim 1, wherein the through hole is of an approximately elliptical form extended in a direction perpendicular to a disposition direction of the leading end region and the communication hole in a state where the first panel portion is flattened.

4. The airbag device according to claim 1, wherein the exhaust hole is disposed in a region between straight lines, one on either side, that link two edges of a joint portion that is joined to the peripheral edge of the exhaust hole in a width direction along a direction perpendicular to a disposition direction of the leading end region and the communication hole in the first panel portion in a flattened state, and two edges of a region coupling with the coupling member in the leading end region.

* * * * *